United States Patent [19]
Duffie et al.

[11] Patent Number: 5,402,412
[45] Date of Patent: Mar. 28, 1995

[54] SYSTEM AND METHOD FOR MONITORING A STREAM OF EVENTS

[75] Inventors: Paul K. Duffie, Palo Alto; Jonathan R. Pearce, Mountain View, both of Calif.

[73] Assignee: DSC Communications Corporation, Plano, Tex.

[21] Appl. No.: 138,148

[22] Filed: Oct. 15, 1993

[51] Int. Cl.⁶ .......................... H04J 3/22; H04L 12/26
[52] U.S. Cl. ...................................... 370/17; 370/60.1; 370/84
[58] Field of Search .................... 370/17, 60, 60.1, 61, 370/79, 84, 85.6, 94.1, 94.2

[56] References Cited
U.S. PATENT DOCUMENTS

| | | | |
|---|---|---|---|
| 5,179,549 | 1/1993 | Joos et al. | 370/17 |
| 5,260,932 | 11/1993 | Vinel | 370/17 X |
| 5,276,676 | 1/1994 | Horn et al. | 370/17 |
| 5,280,470 | 1/1994 | Buhrke et al. | 370/17 X |
| 5,295,135 | 3/1994 | Kammerl | 370/17 |
| 5,317,563 | 5/1994 | Oouchi et al. | 370/17 |

Primary Examiner—Melvin Marcelo
Attorney, Agent, or Firm—Baker & Botts

[57] ABSTRACT

A system (10) is provided for processing data such that the rate at which events occur in a network for a particular user does not exceed a predetermined rate. A request to allow a potential event is received by a sequencer (12). Event rate information is retrieved from random access memory (30) for the particular user and provided to plurality of registers (18). A reference level is generated by reference level generating circuitry (16) for use in determining whether to allow the potential event to occur. A determination is made by comparison circuitry (24) as to whether to allow the potential event based on the reference level and the retrieved event rate information. Function generating circuitry (20) updates the event rate information based on the retrieved event rate information, the reference level, and an output of comparison circuitry (24).

24 Claims, 1 Drawing Sheet

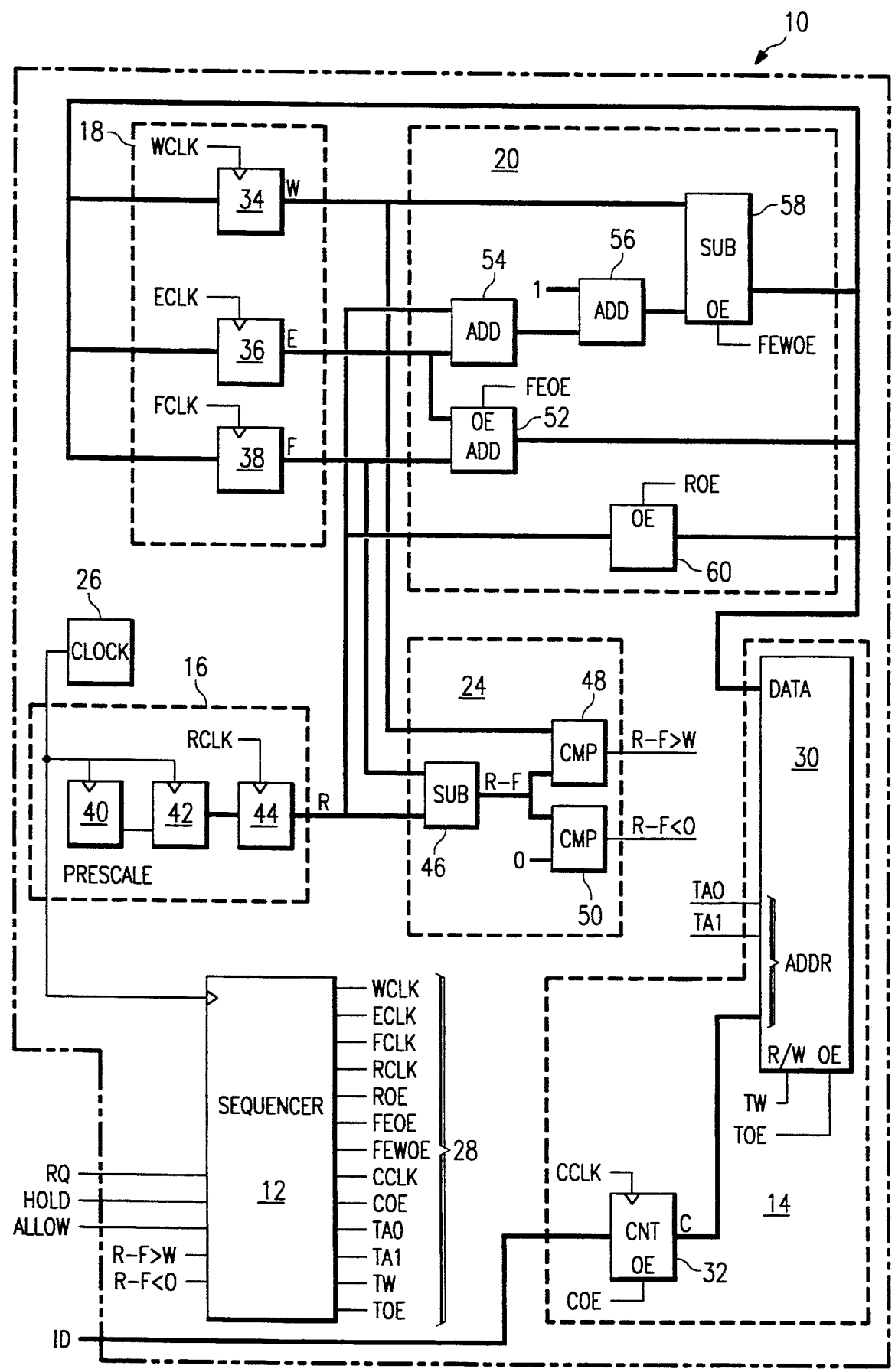

SYSTEM AND METHOD FOR MONITORING A STREAM OF EVENTS

TECHNICAL FIELD OF THE INVENTION

This invention relates, in general, to the field of electronic devices. More particularly, this invention relates to a system and method for monitoring a stream of events such as a stream of cells in an asynchronous transfer mode network.

BACKGROUND OF THE INVENTION

Asynchronous transfer mode ("ATM") is a high speed communications protocol for transmitting various types of data. In an ATM network, information may be transmitted along a single line between various users of the ATM network. The users send data as a stream of individual packages commonly referred to as cells. The cells may comprise a package of data having a length of 53 bytes. In each cell, a portion of the 53 bytes may indicate the ultimate destination of that cell within the ATM network. In the language of the industry, users are connected within the ATM network via virtual circuits. In other words, a data cell may be directed to a particular user on a virtual circuit identified by a number of bits within the cell. For example, the first five bytes of a data cell indicate, among other things, the appropriate virtual circuit. Cells from the various users in the ATM network are intermixed, transmitted along the ATM network, and directed to the appropriate user of the ATM network. Because an ATM network may be a public network, each user will be able to send data or receive data at a predetermined rate, for example, ten megabits per second.

To ensure that a user does not exceed its predetermined rate of transmitting data, it may be necessary to monitor the rate at which the information is exchanged within the ATM network. At the receiving end, this monitoring may be referred to as policing a stream of events. Each virtual circuit may be checked to determine whether it is receiving information at more than the predetermined rate. At the sending end, this process may be referred to as shaping a stream of events. Shaping is just the inverse process of policing. Shaping may be implemented at a user's location to make sure that the user does not send information at more than the predetermined rate.

The ATM Forum has defined a standard by which traffic flow within an ATM network may be monitored. This standard is referred to in the industry as "the leaky bucket" function. Conceptually, the leaky bucket function provides two buckets for each virtual circuit. For example, the first bucket may measure compliance with an average data transmission rate over a fairly long time frame. The second bucket may measure compliance with a higher specified data transmission rate over a short period of time. Each bucket may be conceptualized as having a specific depth and having a hole in its bottom. The hole in the bottom controls the rate at which data flows out of the bucket to establish the predetermined data transmission rate. The depth of each bucket allows an appropriate buffer, or backlog, such that over an appropriate length of time the data transmission rate is within the prescribed limits. The first bucket may be conceptualized as being quite deep so that if data cells are transmitted at an average rate that is less than the predetermined rate, the bucket does not overflow. As for the second bucket, it may be conceptualized to be rather shallow with respect to the first bucket, thereby allowing a higher rate of data transfer over a short period of time. If a bucket overflows, the predetermined data transmission rate has been exceeded.

Several problems and drawbacks may be encountered in an attempt to implement the leaky bucket function for a large number of virtual circuits in an ATM network. First, each bucket in the ATM network may empty at a different rate. In other words, each virtual circuit may be allowed to transmit data at different predetermined rates. In this manner, a system designed to update the contents of each bucket on every clock cycle would be very costly to design and implement. Alternatively, a system designed to implement the leaky bucket function may only update the contents of a bucket when information is sent along the virtual circuit associated with that bucket. However, this technique would require a substantial amount of memory for each bucket in the ATM network. Therefore, a need has arisen for a system and method for monitoring a stream of events.

SUMMARY OF THE INVENTION

In accordance with the present invention, a system and method for monitoring a stream of events is provided which substantially eliminates or reduces disadvantages and problems associated with prior systems and methods.

More specifically, the present invention provides a system for processing data such that the rate at which events occur in a network for a particular user does not exceed a predetermined rate. The system receives a request from a network user to allow a potential event to occur. A reference level for use in determining whether to allow the potential event to occur is generated by the system. The system retrieves event rate information associated with the particular network user from a memory circuit in response to receiving the request. The system determines if previous events for that user have been allowed at such a rate that there is an available backlog to allow the potential event to occur based on the retrieved information and the reference level. Finally, the system updates the event rate information for the selected user using the reference level and the event rate information.

It is a technical advantage of the present invention that a stream of events transmitted by a plurality of virtual circuits may be monitored for compliance with event rates by incrementing a single register. The use of a single register allows a plurality of virtual circuits to be monitored by a system implemented in hardware or software.

It is another technical advantage of the present invention to provide a system and method that may be able to either police or shape a stream of events. The system and method may police a stream of events at a switch in an asynchronous transfer mode network. Alternatively, the system and method may shape a stream of events generated by a user in an asynchronous transfer mode network.

It is another technical advantage of the present invention to provide a system and method for monitoring a stream of events for simultaneous compliance with two or more predetermined event rates. The system and method provide an open collector device which allows simultaneous monitoring for compliance with multiple event rates. For example, a stream of events may be monitored for compliance with both a short term event rate requirement as well as a long term event rate requirement.

BRIEF DESCRIPTION OF THE DRAWINGS

For a more complete understanding of the present invention and the advantages thereof, reference is now made to the following description taken in conjunction with the accompanying drawing wherein:

FIG. 1 illustrates a system for monitoring a stream of events constructed according to the teachings of the present invention.

DETAILED DESCRIPTION OF THE INVENTION

FIG. 1 illustrates a system for monitoring a stream of events indicated generally at 10 and constructed according to the teachings of the present invention. System 10 may, for example, shape a stream of events generated by a user. Alternatively, system 10 may police a stream of events at a switch in an asynchronous transfer mode (ATM) network.

System 10 implements a "multiple leaky bucket function" to determine whether the rate at which events occur for a particular user exceeds a predetermined rate. If the rate is exceeded, a potential event will not be allowed to occur. System 10 may comprise one or more leaky buckets for each virtual circuit in an associated ATM network. A leaky bucket keeps track of the rate at which events occur on a virtual circuit. The level to which a particular bucket is filled is called the fill level. The fill level is increased when an event is allowed to occur. Essentially, the fill level of a particular bucket is a running total of the number of events that have occurred for a given virtual circuit. Whether a potential event is allowed to occur by System 10 is determined by checking the amount of space available in a particular bucket. As described below, System 10 uses a reference level, R, in determining whether there is enough space available in a particular bucket. The difference between the reference level and the fill level may be referred to as an available backlog corresponding to the space available in a particular bucket. If the available backlog is greater than zero, system 10 will allow a potential event to occur. System 10 comprises sequencer circuitry 12, memory circuitry 14, reference level generating circuitry 16, a plurality of registers 18, function generating circuitry 20, comparison circuitry 24 and clock 26.

Sequencer 12 of system 10 may comprise, for example, a combinational logic circuit operable to control the sequence of steps implemented by system 10. Sequencer 12 receives a request from an associated ATM network to allow a potential event on a line RQ. Sequencer 12 controls the operation of system 10 via a plurality of control lines 28. For simplicity and conciseness, the manner in which control lines 28 are coupled to the other elements of FIG. 1 are shown by placing the alphanumeric designation of the appropriate control line adjacent the element to which it is coupled. The timing of sequencer 12 is controlled by clock 26.

Memory circuitry 14 of system 10 stores information relating to each bucket associated with system 10 for use in determining whether to allow the potential event. The information is stored in a random access memory (RAM) 30. For example, RAM 30 may store a fill level, F, a fill rate, 1/E, and a depth, W, for each bucket associated with system 10. A data line of memory circuitry 14 is coupled to plurality of registers 18. Sequencer 12 enables the data line of RAM 30 by a signal TOE on a control line 28. The data line of RAM 30 may write data to registers 18 or read data from registers 18 based on a control signal TW from sequencer 12.

Each of the values stored in RAM 30 has a specific physical significance in system 10. For example, the fill level, F, indicates the level to which a particular bucket is filled. This value may be referred to as an event counter. The fill rate, 1/E, is the rate at which a particular bucket is filled upon the allowance of a potential event to occur, therefore, the fill rate is proportional to the predetermined event rate. This means that the fill rate is proportional to the rate at which events are allowed to occur for a particular virtual circuit. As described above, the difference between the reference level and the fill level is equal to an available backlog for a particular virtual circuit. The depth, W, may be considered to be the maximum backlog possible for a particular virtual circuit.

Upon receiving a request to allow an event, an address for the appropriate bucket may be provided to memory circuitry 14 by a stream identification signal (ID). The ID signal is stored in an address register 32. The ID signal may correspond to a series of bits of the event to be transmitted. Two additional address lines labeled TA0 and TA1 provide for addressing up to four separate pieces of information in RAM 30 corresponding to the bucket identified by the ID signal. TA0 and TA1 are provided to RAM 30 via control lines 28. Once a particular memory location has been addressed, the data in that location may be transmitted to plurality of registers 18. For example, the depth of the bucket may be transmitted to depth register 34, the fill rate may be transmitted to fill rate register 36, and the fill level may be transmitted to fill level register 38.

Reference level generating circuitry 16 generates a reference level to determine whether to allow an event to occur as described below. Reference level generating circuitry 16 is coupled to provide a reference level, R, to comparison circuitry 24 and function generating circuitry 20. Reference level generating circuitry 16 comprises first and second counters 40 and 42, respectively, and register 44. Reference level generating circuitry 16 is coupled to clock 26 of system 10. First and second counters 40 and 42 are coupled so as to provide an incrementing reference level, R, to register 44 such that R increments at a predetermined rate, slower than clock 26. In this manner, first and second counters scale down the rate of clock 26.

Comparison circuitry 24 determines whether the bucket associated with a request for an event may accept the event. Comparison circuitry 24 comprises a subtractor 46 and first and second comparators 48 and 50, respectively. Subtractor 46 is coupled to receive R from reference level generating circuitry 16 and F from fill level register 38. Subtractor 46 subtracts the value of F from the value of R to determine the amount of space available in a particular bucket. The output of subtractor 46 is coupled to first and second comparators 48 and 50. First comparator 48 is also coupled to the output of depth register 34. Second comparator 50 is also coupled to a constant zero input.

First and second comparators 48 and 50 determine which of the functions generated by function generating circuit 20 should be used to update the fill level of the selected bucket. Additionally, second comparator 50 determines whether to allow the potential event. In first comparator 48, a determination is made as to whether the space available in the bucket is greater than the depth of the bucket. In other words, whether the available backlog is greater than the maximum backlog. Second comparator 50 determines whether the space remaining in the bucket is less than zero. In other words, whether there is any available backlog. If there is no available backlog, the event is not allowed. The output of first comparator 48 and second comparator 50 are both coupled to sequencer 12.

Function generating circuitry 20 generates an updated fill level for a bucket. The updated fill level is stored in RAM 30. Function generating circuitry 20 may generate, for example, three different functions described more fully below. The function that is provided to RAM 30 may be determined by a control signal from sequencer 12 on control line 28. Function generating circuitry 20 may comprise, for example, first, second, and third adders 52, 54, and 56, respectively, subtractor 58 and register 60. Fill rate register 36 and fill level register 38 are coupled to first adder 52. The output of first adder 52 comprises one function of function generating circuitry 20. The second function comprises the reference level R of reference level generating circuitry 16. The value of R may be provided to RAM 30 via register 60. Register 44 and fill level register 38 are coupled to second adder 54. A constant high logic level, or "1" input and the output of second adder 54 are coupled to third adder 56. The output of third adder 56 and window register 34 are coupled to subtractor 58. The output of subtractor 58 comprises a third function generated by function generating circuitry 20. The output of function generating circuitry 20 comprises an updated fill level for the bucket for which a data transfer has been requested.

In operation, system 10 receives a request by a virtual circuit to transmit a piece of data in an ATM network. The request is received at line RQ of sequencer 12. Address register 32 provides an address to RAM 30 for the bucket associated with the requesting virtual circuit. Address register 32 contains an address provided by an ID signal. RAM 30 provides the depth, fill level, and fill rate associated with the addressed bucket to depth register 34, fill level register 38, and fill rate register 36, respectively. Function generating circuitry 20 generates three potential updated fill levels for storage in RAM 30 in response to the values stored in plurality of registers 18 and register 44. Additionally, comparison circuitry 24 determines which of the functions generated by function generating circuitry 20, if any, should be provided to RAM 30 to update the fill level. Comparison circuitry 24 provides signals to sequencer 12 indicating whether the event should be allowed to occur. Sequencer 12 provides an output labeled "allow" to indicate whether the event should be allowed. Sequencer 12 also provides an output labeled "hold" to indicate when system 10 has completed processing a request to allow a potential event. When the event is processed, sequencer 12 brings the hold output to a high logic level.

The hold and allow outputs of sequencer 12 comprise open collector outputs. The use of an open collector output allows a plurality of systems constructed in a manner similar to system 10 to be coupled in parallel. This allows simultaneous monitoring for multiple event rate requirements. In this manner, an event will not be allowed unless each system 10 indicates that the event should be allowed by bringing the allow output to a high logic level.

As System 10 operates, the reference level constantly increases at a regular frequency. However, first and second counters 40 and 42 of reference level generating circuitry 16 may only generate a finite maximum reference level. Once the reference level reaches its maximum value, reference level generating circuitry 16 may reset the reference level to zero thereby implementing a wrapping counter. In this manner, the value of the reference level at a particular time may appear to be less than the fill level of a particular bucket, even though the reference level is actually greater than the fill level. To compensate for this situation, system 10 may implement modulo arithmetic when subtracting the fill level from the reference level.

System 10 implements a series of functions that may be used to determine whether allowing a potential event to occur would cause a predetermined event rate to be exceeded. The functions implemented by system 10 are derived below. First, a variable $V_{i,t}$ is defined in Equation (1):

$$V_{i,t} = \begin{cases} 1 & \text{if event for bucket } i \text{ occurs at time } t \\ 0 & \text{otherwise} \end{cases} \tag{1}$$

In Equation (1) $V_{i,t}$ is an indicator as to whether an event for a particular bucket i has occurred.

In Equation (2), a variable $A_{i,t}$ is defined that indicates whether a particular event is allowed to occur.

$$A_{i,t} = \begin{cases} 1 & \text{if } V_{i,t} = 1 \text{ and } B_{i,t} < D_i \\ 0 & \text{otherwise} \end{cases} \tag{2}$$

In Equation (2), the variable $B_{i,t}$ is the fill level in a particular bucket i, at a particular time t. Additionally, the variable $D_i$ corresponds to the actual depth of a particular bucket i.

Equation (3) provides four different functions that indicate an updated fill level in a particular bucket i, at a time $t+1$.

In Equation (3), $E_i$ is equal to the rate of which a bucket i is emptying. If no event has occurred, the fill level at time $t+1$ of a particular bucket i is equal to the previous fill level, $B_{i,t}$, less the emptying rate, $E_i$.

$$B_{i,t+1} = \begin{cases} B_{i,t} - E_i & \text{if } V_{i,t} = 0 \\ A_{i,t} & \text{if } B_{i,t} \leq 0 \\ D_i - E_i + A_{i,t} & \text{if } B_{i,t} \geq D_i \\ B_{i,t} - E_i + A_{i,t} & \text{otherwise} \end{cases} \tag{3}$$

This corresponds to the first function shown in Equation (3). If an event has occurred, the new fill level at time $t+1$ may be calculated accorded to three different functions. First, if the fill level at time t is less than or equal to zero, then the new fill level at time $t+1$ is equal to $A_{i,t}$. This means that if the bucket is actually empty at time t, and an event occurs, then the fill level at time $t+1$ will be equal to the amount by which a bucket i is filled on an allowed event. Second, if the fill level at time t is greater than or equal to $D_i$, the new fill level at time $t+1$ is equal to $D_i$ minus $E_i$ plus $A_{i,t}$. This means that if the bucket is overflowing, the new fill level will be initially set equal to the depth of the bucket. The amount removed for one clock cycle is subtracted from this new fill level. Finally, an amount corresponding to an allowed event is added to give the new fill level. Otherwise, the value of the fill level at t+1 is equal to $B_{i,t}$ minus $E_i$ plus $A_{i,t}$. This means that the new fill level at time t+1 is initially set equal to the old fill level. The amount removed from the bucket for one clock cycle is subtracted from this new level. An amount corresponding to an allowed event is added to give the new fill level.

To simplify the implementation of the functions of Equation (3), Equation (3) may be normalized. In Equation (3), each bucket has its own emptying rate, $E_i$. These equations may be normalized by having each bucket empty at the same rate, but fill at different rates.

This means that in a normalized system, each bucket will empty at a unit rate and fill at a rate of $1/E_i$. Additionally, in a normalized system, the depth of each bucket may be referred to as $D_i/E_i$. This may be defined as the depth, $W_i$, of the bucket. In the normalized system, each bucket empties at a uniform rate. Therefore, rather than updating the content of each bucket on each clock cycle, a reference level may be defined. Incrementing the reference level according to Equation (4) compensates for not updating the fill level in each bucket on each clock cycle.

$$R_{t+1} = R_t + 1 \tag{4}$$

The reference level may be thought of as adding a unit ring to the top edge of each bucket on each clock cycle. In this manner, the amount of space in the bucket will be increased by one unit. This corresponds to the unit increase in space that would be provided by decreasing the fill level of each of the individual buckets by one unit on each clock cycle.

In the normalized system, the relative fill level of a particular bucket is referred to by the variable $F_{i,t}$. The normalized system may be related to the system of Equations (1) through (3) by equating the space available in each system. The amount of space available in the normalized system is therefore equal to $R_t - F_{i,t}$. The amount of space available in the original system is equal to $D_i - B_{i,t}$. The two equations relating to the amount of available space may be equated by dividing the space in the original system by $E_i$ as shown in Equation (5).

$$\frac{D_i - B_{i,t}}{E_i} = R_t - F_{i,t} \tag{5}$$

Using conventional algebraic operations, Equation (5) may be manipulated to provide an equation for the relative fill level as shown in Equation (6).

$$F_{i,t} = R_t - \left(\frac{D_i - B_{i,t}}{E_i}\right) \tag{6}$$

Equation (5) may also be manipulated to provide an equation for the absolute fill level, $B_{i,t}$ as shown in Equation (7).

$$B_{i,t} = D_i - (R_t - F_{i,t})E_i \tag{7}$$

The relative fill level at a time t+1 may be determined by substituting the variable t+1 for the variable t in Equation (6). This result is shown in Equation (8).

$$F_{i,t+1} = R_{t+1} - \left(\frac{D_i - B_{i,t+1}}{E_i}\right) \tag{8}$$

Substituting Equations (3) and (4) into Equation (8) results in new Equation (9).

$$F_{i,t+1} = (R_t + 1) - \tag{9}$$

$$\frac{1}{E_i} \cdot \begin{cases} D_i - B_{i,t} + E_i & \text{if } V_{i,t} = 0 \\ D_i - A_{i,t} & \text{if } B_{i,t} \leq 0, V_{i,t} = 1 \\ D_i - D_i + E_i - A_{i,t} & \text{if } B_{i,t} \geq D_i V_{i,t} = 1 \\ D_i - B_{i,t} + E_i - A_{i,t} & \text{otherwise} \end{cases}$$

Bringing all of the terms inside the bracket of Equation (9) and substituting the value of Equation (7) for the variable $B_{i,t}$ results in Equation (10).

$$F_{i,t+1} = \tag{10}$$

$$\begin{cases} R_t - \frac{(D_i - B_{i,t})}{E_i} & \text{if } V_{i,t} = 0 \\ R_t + 1 - \frac{D_i}{E_i} + \frac{A_{i,t}}{E_i} & \text{if } R_t - F_{i,t} \geq \frac{D_i}{E_i}, V_{i,t} = 1 \\ R_t + \frac{A_{i,t}}{E_i} & \text{if } R_t - F_{i,t} \leq 0, V_{i,t} = 1 \\ R_t - \frac{D_i}{E_i} + \frac{B_{i,t}}{E_i} + \frac{A_{i,t}}{E_i} & \text{otherwise} \end{cases}$$

In Equation (10), the first and fourth functions contain equations that are the same as the right side of the equality in Equation (6). Therefore, these equations may be replaced with the variable $F_{i,t}$. This result is shown in Equation (11).

$$F_{i,t+1} = \tag{11}$$

$$\begin{cases} F_{i,t} & \text{if } V_{i,t} = 0 \\ R_{t+1} - \frac{D_i}{E_i} + \frac{A_{i,t}}{E_i} & \text{if } R_t - F_{i,t} \geq \frac{D_i}{E_i}, V_{i,t} = 1 \\ R_t + \frac{A_{i,t}}{E_i} & \text{if } R_t - F_{i,t} \leq 0, V_{i,t} = 1 \\ F_{i,t} + \frac{A_{i,t}}{E_i} & \text{otherwise} \end{cases}$$

Finally, equation (12) may be derived from Equation (11) by substituting appropriate values equation (2) for $A_{i,t}$. The four functions shown in Equation (12) correspond to the functions implemented by System 10 of FIG. 1.

$$F_{i,t+1} = \tag{12}$$

-continued $$\begin{cases} F_{i,t} & \text{if } V_{i,t} = 0 \\ \left(R_{t+1} - \dfrac{D_i}{E_i}\right) + \dfrac{1}{E_i} & \text{if } R_t - F_{i,t} \geq \dfrac{D_i}{E_i}, V_{i,t} = 1 \\ R_t & \text{if } R_t - F_{i,t} \leq 0, V_{i,t} = 1 \\ F_{i,t} + \dfrac{1}{E_i} & \text{otherwise} \end{cases}$$

According to the first function of Equation (12), the relative fill level at time t+1 is equal to the relative fill level at time t if no event has occurred for bucket i. This means that if no event occurred, the relative fill level is unchanged. As for the second function, it begins by setting the updated fill level to the next reference level less the normalized depth of the bucket. This part of this function essentially sets the bucket to empty. Next, this function adds the amount by which a bucket i is filled upon the occurrence of an event. This second function of Equation (12) is implemented if the difference between the reference level and the fill level is greater than or equal to the depth of a bucket i. This corresponds to the situation where the bucket i is empty. In this case, the event is allowed. The third function is for the case where the bucket is already full. In this event, the updated fill level is equal to the reference level at time t and the event is not allowed. Physically, this means that at time t+1, the amount of space in the bucket will be equal to one unit because the fill level will be equal to $R_t$ and the new reference level will be equal to $R_t+1$. The difference between these two values is equal to 1. Finally, if the bucket is not full or empty, the updated fill level is equal to the current fill level plus the amount by which a bucket is filled upon the occurrence of an event.

Although the present invention has been described in detail, it should be understood that various changes, substitutions and alterations may be made hereto without departing from the spirit and scope of the invention as defined by the appended claims.

What is claimed is:

1. A system for processing data, comprising: circuitry for receiving a request from a network user to allow a potential event to occur;
    circuitry for generating timing signal pulses:
    circuitry responsive to said generating circuitry for incrementing a reference level for use in determining whether to allow said potential event to occur;
    circuitry responsive to said receiving circuitry for retrieving event rate information associated with said network user from a memory circuit;
    circuitry responsive to said incrementing circuitry and said retrieving circuitry for determining if previous events have been allowed at such a rate for the user that there is an available backlog to allow said potential event to occur; and
    circuitry responsive to said incrementing circuitry and said retrieving circuitry for selectively updating said event rate information for said network user using the reference level and said event rate information retrieved from said memory circuit such that the rate at which events occur for a particular user does not exceed a predetermined rate.

2. The system of claim 1, wherein said retrieving circuitry comprises:
    a random access memory operable to store an event count, a maximum backlog amount, and an event rate for the selected user; and
    a plurality of registers responsive to said random access memory for providing said event count, said maximum backlog and said event rate to said updating circuitry and said determining circuitry.

3. The system of claim 1, wherein said generating circuitry and said incrementing circuitry comprise:
    a clock;
    a plurality of counters responsive to said clock for scaling down the frequency of said clock; and
    a register responsive to said counters for storing a reference level such that said reference level increments at a frequency slower than said clock.

4. The system of claim 1, wherein said determining circuitry comprises:
    a subtractor for determining said available backlog by subtracting an event count for said network user from said reference level; and
    a comparator responsive to said subtractor and a constant low logic level for comparing said available backlog with zero such that a flag is set to allow said potential event if the available backlog exceeds zero.

5. The system of claim 1, wherein said determining circuitry further comprises an open collector output to indicate whether to allow the potential event such that the rate at which events occur for a particular user may be simultaneously maintained below multiple predetermined rates.

6. The system of Claim 1, wherein said updating circuitry comprises:
    first function generating circuitry responsive to said reference level generating circuitry and said retrieving circuitry for generating the function $$\left(R_{t+i} - \dfrac{D_i}{E_i}\right) + \dfrac{1}{E_i} \text{ if } R_t - F_{i,t} \geq \dfrac{D_i}{E_i}$$

second function generating circuitry responsive to said reference level generating circuitry for generating the function $$R_t \text{ if } R_t - F_{i,t} \leq 0$$

and
    third function generating circuitry responsive to said retrieving circuitry for generating the function $$F_{i,t} + \dfrac{1}{E_i} \text{ if } o < R_t - F_{i,t} < \dfrac{D_i}{E_i}$$

wherein $R_t+1$, and $R_t$ are reference levels, $D_i/E_i$ is a maximum backlog, $1/E_i$ is an event rate, and $F_{i,t}$ is an event count.

7. A system for processing data in an asynchronous transfer mode network, comprising:
    circuitry for receiving a request from a network user to allow a potential event to occur;
    circuitry for generating timing signal pulses;
    circuitry responsive to said generating circuitry for incrementing a reference level for use in determining whether to allow said potential event to occur;

circuitry responsive to said receiving circuitry for retrieving event rate information associated with said network user from a memory circuit;

circuitry responsive to said incrementing circuitry and said retrieving circuitry for determining if previous events have been allowed at such a rate for the user that there is an available backlog to allow said potential event to occur; and circuitry responsive to said incrementing circuitry and said retrieving circuitry for selectively updating said event rate information for said network user using the reference level and said event rate information retrieved from said memory circuit such that the rate at which events occur for a particular user does not exceed a predetermined rate.

8. The system of claim 7, wherein said retrieving circuitry comprises:
   a random access memory operable to store an event count, a maximum backlog amount, and an event rate for the selected user; and
   a plurality of registers responsive to said random access memory for providing said event count, said maximum backlog and said event rate to said updating circuitry and said determining circuitry.

9. The system of claim 7, wherein said generating circuitry and said incrementing circuitry comprises:
   a clock;
   a plurality of counters responsive to said clock for scaling down the frequency of said clock; and
   a register responsive to said counters for storing a reference level such that said reference level increments at a frequency slower than said clock.

10. The system of claim 7, wherein said determining circuitry comprises:
    a subtractor for determining said available backlog by subtracting an event count for said network user from said reference level; and
    a comparator responsive to said subtractor and a constant low logic level for comparing said available backlog with zero such that an open collector output is brought to a high logic level to allow said potential event if the available backlog exceeds zero.

11. The system of claim 7, wherein said determining circuitry further comprises an open collector output to indicate whether to allow the potential event such that the rate at which events occur for a particular user may be simultaneously maintained below multiple predetermined rates.

12. The system of claim 7, wherein said updating circuitry comprises:
    first function generating circuitry responsive to said reference level generating circuitry and said retrieving circuitry for generating the function $$\left(R_{t+i} - \frac{D_i}{E_i}\right) + \frac{1}{E_i} \text{ if } R_t - F_{i,t} \geq \frac{D_i}{E_i};$$

second function generating circuitry responsive to said reference level generating circuitry for generating the function $$R_t \text{ if } R_t - F_{i,t} \leq 0;$$

and third function generating circuitry responsive to said retrieving circuitry for generating the function $$F_{i,t} + \frac{1}{E_i} \text{ if } o < R_t - F_{i,t} < \frac{D_i}{E_i}$$

wherein $R_t+1$, and $R_t$ are reference levels, $D_i/E_i$ is a maximum backlog, $1/E_i$ is an event rate, and $F_{i,t}$ is an event count.

13. A method for processing data, comprising the steps of:
    receiving a request from a network user to allow a potential event to occur;
    generating timing signal pulses;
    incrementing a reference level in response to the timing signal pulses for use in determining whether to allow the potential event to occur;
    retrieving event rate information associated with the network user from a memory circuit;
    determining if previous events have been allowed at such a rate for the network user that there is an available backlog to allow the potential event to occur; and
    selectively updating the event rate information for the network user using the reference level and the event rate information retrieved from the memory circuit such that the rate at which events occur for the network user does not exceed a predetermined rate.

14. The method of claim 13, wherein said step of retrieving event rate information comprises the steps of:
    receiving an address for a memory location containing the event rate information for the network user; and
    retrieving an event count, a maximum backlog amount, and an event rate for the user from a random access memory.

15. The method of claim 13, wherein said steps of generating timing signal pulses and incrementing a reference level comprise the steps of:
    generating a timing signal having a predetermined frequency using a clock;
    scaling down the frequency of the clock using a plurality of counters; and
    storing a reference level in a register coupled to the counters such that the reference level increments at a frequency slower than the clock.

16. The method of claim 13, wherein said step of determining whether to allow the potential event comprises the steps of:
    determining the available backlog for a particular user by subtracting the reference level from an event count for the network user;
    comparing the available backlog with zero; and
    setting a flag to allow the event if the available backlog exceeds zero.

17. The method of claim 13, and further comprising the step of generating an open collector output to indicate whether to allow the potential event such that the rate at which events occur for a particular user may be simultaneously maintained below multiple predetermined rates.

18. The method of claim 13, wherein said step of selectively updating comprises the steps of:
    generating the function $$\left(R_{t+i} - \frac{D_i}{E_i}\right) + \frac{1}{E_i} \text{ if } R_t - F_{i,t} \geq \frac{D_i}{E_i};$$

generating the function $R_t$ if $R_t - F_{i,t} \leq 0$; and generating the function $$F_{i,t} + \frac{1}{E_i} \text{ if } o < R_t - F_{i,t} < \frac{D_i}{E_i}$$

wherein $R_t+1$, and $R_t$ are reference levels, $D_i/E_i$ is a maximum backlog, $1/E_i$ is an event rate, and $F_{i,t}$ is an event count.

19. A method for processing data in an asynchronous transfer mode network, comprising the steps of:
receiving a request from a network user to allow a potential event to occur;
generating timing signal pulses;
incrementing a reference level in response to the timing signal pulses for use in determining whether to allow the potential event to occur;
storing the reference level in a register;
retrieving event rate information associated with the network user from a memory circuit;
storing the event rate information in a plurality of registers;
determining if previous events have been allowed at such a rate for the network user that there is an available backlog to allow the potential event to occur; and
selectively updating the event rate information for the selected user using the reference level and the event rate information retrieved from the memory circuit such that the rate at which events occur for the network user does not exceed a predetermined rate.

20. The method of claim 19, wherein said step of retrieving event rate information comprises the steps of:
receiving an address for a memory location containing the event rate information for the network user; and
retrieving an event count, a maximum backlog amount, and an event rate for the user from a random access memory.

21. The method of claim 19, wherein said step of generating timing signal pulses and incrementing a reference level comprise the steps of:
generating a timing signal having a predetermined frequency using a clock;
scaling down the frequency of the clock using a plurality of counters such that the reference level increments at a frequency slower than the clock.

22. The method of claim 19, wherein said step of determining whether to allow the potential event comprises the steps of:
determining the available backlog for a particular user by subtracting the reference level from an event count for the network user;
comparing the available backlog with zero; and
bringing an open collector output to a high logic level to allow the event if the available backlog exceeds zero.

23. The method of claim 19, and further comprising the step of generating an open collector output to indicate whether to allow the potential event such that the rate at which events occur for a particular user may be simultaneously maintained below multiple predetermined rates.

24. The method of claim 19, wherein said step of selectively updating comprises the steps of:
generating the function $$\left(R_{t+i} - \frac{D_i}{E_i}\right) + \frac{1}{E_i} \text{ if } R_t - F_{i,t} \geq \frac{D_i}{E_i};$$

generating the function $R_t$ if $R_t - F_{i,t} \leq 0$; and generating the function $$F_{i,t} + \frac{1}{E_i} \text{ if } o < R_t - F_{i,t} < \frac{D_i}{E_i}$$

wherein $R_t+1$, and $R_t$ are reference levels, $D_i/E_i$ is a maximum backlog, $1/E_i$ is an event rate, and $F_{i,t}$ is an event count.

\* \* \* \* \*

UNITED STATES PATENT AND TRADEMARK OFFICE
CERTIFICATE OF CORRECTION

PATENT NO. : 5,402,412
DATED : March 28, 1995
INVENTOR(S) : Duffie, et al

It is certified that error appears in the above-indentified patent and that said Letters Patent is hereby corrected as shown below:

Column 11, line 26, after "incrementing circuitry", delete "comprises", and insert -- comprise --.

Column 10, line 41, after "function" delete "($R_{t+i}$", and insert -- ($R_{t+1}$ --.

Column 11, line 57, after "function" delete "($R_{t+i}$", and insert -- ($R_{t+1}$ --.

Column 13, line 3, delete "$R_{t+i}$", and insert -- ($R_{t+1}$ --.

Column 14, line 4 delete "step" and insert -- steps --.

Column 14, line 30, after "function" delete "($R_{t+i}$" and insert -- ($R_{t+1}$ --.

Signed and Sealed this

Twenty-sixth Day of September, 1995

Attest:

BRUCE LEHMAN

*Attesting Officer*  *Commissioner of Patents and Trademarks*